US009718239B2

(12) United States Patent
Huang

(10) Patent No.: US 9,718,239 B2
(45) Date of Patent: Aug. 1, 2017

(54) THREE DIMENSIONAL PRINTING APPARATUS AND THREE DIMENSIONAL PRINTING METHOD

(71) Applicants: XYZprinting, Inc., New Taipei (TW); Kinpo Electronics, Inc., New Taipei (TW); Cal-Comp Electronics & Communications Company Limited, New Taipei (TW)

(72) Inventor: Yao-Te Huang, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 334 days.

(21) Appl. No.: 14/612,295

(22) Filed: Feb. 3, 2015

(65) Prior Publication Data

US 2016/0129639 A1    May 12, 2016

(30) Foreign Application Priority Data

Nov. 11, 2014    (CN) .......................... 2014 1 0631456

(51) Int. Cl.
```
B29C 67/00      (2017.01)
B33Y 10/00      (2015.01)
B33Y 30/00      (2015.01)
```
(52) U.S. Cl.
CPC ...... *B29C 67/0059* (2013.01); *B29C 67/0085* (2013.01); *B33Y 10/00* (2014.12); *B33Y 30/00* (2014.12)

(58) Field of Classification Search
CPC ............ B29C 67/0055; B29C 67/0059; B29C 67/0085; B29C 67/0096
See application file for complete search history.

(56) References Cited

U.S. PATENT DOCUMENTS 5,354,414 A * 10/1994 Feygin ................ B29C 67/0077
156/245
5,746,844 A *  5/1998 Sterett ................ B29C 67/0059
148/522

(Continued)

FOREIGN PATENT DOCUMENTS

CN         1300667       6/2001
CN       103552244       2/2014
(Continued)

OTHER PUBLICATIONS

"Office Action of China Counterpart Application," issued on Apr. 19, 2017, p. 1-p. 7.

*Primary Examiner* — Timothy Kennedy
(74) *Attorney, Agent, or Firm* — Jianq Chyun IP Office

(57) ABSTRACT

A three dimensional printing (3D) apparatus and a three dimensional (3D) printing method are used for forming and stacking a plurality of modeling layers into a 3D object. The 3D printing apparatus includes a body having a modeling platform, a transmission module disposed on the body, a printing module, a curing module and a laser module. The printing module, the curing module and the laser module are disposed at and controlled by the transmission module to move relative to the body, respectively. A liquid modeling material is jetted from the printing module to the modeling platform and cured by the curing module to form the modeling layers. The laser module moves along a normal direction of the modeling platform according to a condition parameter and provides a laser beam along at least one plane parallel to the modeling platform to cut and trim at least one modeling layer.

10 Claims, 5 Drawing Sheets

(56) References Cited

U.S. PATENT DOCUMENTS

| | | | | |
|---|---|---|---|---|
| 6,153,034 | A * | 11/2000 | Lipsker | B29C 67/0074 156/167 |
| 6,814,823 | B1 * | 11/2004 | White | B29C 67/0074 156/73.1 |
| 2005/0015175 | A1 * | 1/2005 | Huang | B29C 67/0059 700/121 |
| 2005/0288813 | A1 * | 12/2005 | Yang | B29C 67/0055 700/119 |
| 2006/0251796 | A1 * | 11/2006 | Fellingham | B05B 17/0669 427/8 |
| 2014/0291886 | A1 * | 10/2014 | Mark | B29C 67/0055 264/163 |

FOREIGN PATENT DOCUMENTS

| | | |
|---|---|---|
| CN | 103909655 | 7/2014 |
| CN | 103935035 | 7/2014 |
| CN | 203739245 | 7/2014 |

* cited by examiner

THREE DIMENSIONAL PRINTING APPARATUS AND THREE DIMENSIONAL PRINTING METHOD

CROSS-REFERENCE TO RELATED APPLICATION

This application claims the priority benefit of China application serial no. 201410631456.8, filed on Nov. 11, 2014. The entirety of the above-mentioned patent application is hereby incorporated by reference herein and made a part of this specification.

TECHNICAL FIELD

The disclosure relates to a three dimensional printing apparatus and a three dimensional printing method.

DESCRIPTION OF RELATED ART

With the advance in computer-aided manufacturing (CAM), the manufacturing industry has developed a three dimensional (3D) printing technology to rapidly convert original design concepts into physical objects. The 3D printing technology is actually a general designation of a series of rapid prototyping (RP) techniques. A basic principle thereof is a stacked fabrication by using a RP machine to form a cross-sectional shape of a workpiece in an X-Y plane through scanning, and to intermittently shift by a layer thickness along a Z coordinate, so as to form a 3D object ultimately. The 3D printing technology is not limited to any geometric shape. In addition, the more complex the components are, the more preeminent the RP technology demonstrates. The 3D printing technology may greatly save manpower and processing time. With a demand of shortest time, a digital 3D model information which is designed by using a 3D computer-aided design (CAD) software may be truthfully presented as a tangible object. Furthermore, a geometric curve of the object could be truthfully appreciated. Moreover, assembly ability of components thereof may be tested and even functions thereof may possibly be tested.

At present, techniques for forming a plurality of thin cross-sectional layers have been developed. For example, a printing module usually moves above a base along a X-Y coordinate of a X-Y-Z coordinate which is constructed according to a design data of a 3D model, thereby forming accurate shapes of cross-sectional layers by jetting a construction material. Then, the deposited material is naturally hardened or cured by adopting, for example, a strong light source, so as to form the desired cross-sectional layers, and further forming a 3D object in a state of curing layer by layer. The modeling techniques vary with material properties. For example, "ink" for printing may be made by fusing or softening plastic materials, such as by the selective laser sintering (SLS) and the fused deposition modeling (FDM).

However, in a process of stacking and modeling an object with a liquid modeling material, voids could be easily generated between "ink drop" and "ink drop" due to surface tension. Thus, a structural defect would be formed after curing, and the object may even collapse after a few layers are stacked by the modeling material, thereby causing unevenness in a surface of the 3D object. Accordingly, an issue of minimizing the structural defects during a 3D printing process has become a subject for persons skilled in the art.

SUMMARY

The disclosure provides a three dimensional (3D) printing apparatus and a three dimensional (3D) printing method, which flatten at least one modeling layer during a process of modeling a 3D object, so as to eliminate defects that exist in a structure of the 3D object.

The 3D printing apparatus of the disclosure is used for forming a plurality of modeling layers and a 3D object is formed by stacking the modeling layers. The 3D printing apparatus includes a body, a transmission module, a printing module, a curing module and a laser module. The body has a modeling platform. The transmission module is disposed on the body. The printing module, the curing module, and the laser module are disposed at the transmission module and controlled by the transmission module to move relative to the body, respectively. A liquid modeling material is jetted from the printing module to a modeling platform and cured by the curing module to form the modeling layers. The laser module moves along a normal direction of the modeling platform according to a condition parameter and provides a laser beam along at least one plane which is parallel to the modeling platform to cut and trim at least one modeling layer.

The 3D printing method of the disclosure is used for forming a 3D object. The 3D printing method includes: providing a liquid modeling material layer by layer on a modeling platform and curing the liquid modeling material to form a plurality of modeling layers, and forming a 3D object by stacking the modeling layers; and providing a laser beam along at least one plane which is parallel to the modeling platform according to the condition parameter to cut and trim at least one modeling layer.

In an embodiment of the disclosure, the laser module is a carbon dioxide ($CO_2$) laser module.

In an embodiment of the disclosure, a wavelength of a laser beam provided by the laser module is 10.6 micrometers ($\mu m$).

In an embodiment of the disclosure, the 3D printing apparatus further includes a sensor module and a control module. The sensor module is disposed on the body, and senses a surface profile of a modeling layer which is located on a modeling platform according to the condition parameter and generates a profile signal. The control module is electrically connected to the sensor module and the laser module, and receives the profile signal and determines whether the laser module is driven to trim the modeling layer according to the profile signal.

In an embodiment of the disclosure, the 3D printing apparatus further includes a control module which is electrically connected to a printing module, a curing module and a laser module. The control module drives the laser module to trim a modeling layer according to the condition parameter.

In an embodiment of the disclosure, the condition parameter includes modeling time, a number of layers, or a structural height of the at least one modeling layer.

In an embodiment of the disclosure, the 3D printing method further includes: detecting a surface profile of at least one modeling layer according to a condition parameter; and determining whether a laser beam is provided to trim the at least one modeling layer according to the detected surface profile.

In an embodiment of the disclosure, when a protrusion and a recess coexist on a surface profile of the at least one modeling layer, a laser beam is provided to trim the modeling layer having the recess.

In view of the above, for the 3D printing apparatus and the 3D printing method of the previous embodiments in the disclosure, in a process of gradually stacking a plurality of modeling layers to form a 3D object, a measure of flattening at least one modeling layer is applied. Namely, a laser beam is provided to horizontally cut and trim the at least one modeling layer along at least one plane which is parallel to a modeling platform. Therefore, an operation of eliminating defects existing in a structure, such as the voids, is performed. Accordingly, structural defects caused by a liquid modeling material may be eliminated by trimming of a laser beam. Thus, it may be ensured that, in a process of modeling a 3D object, changes of states of a material would not be a concern, and an overall structural strength would not be adversely impacted.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
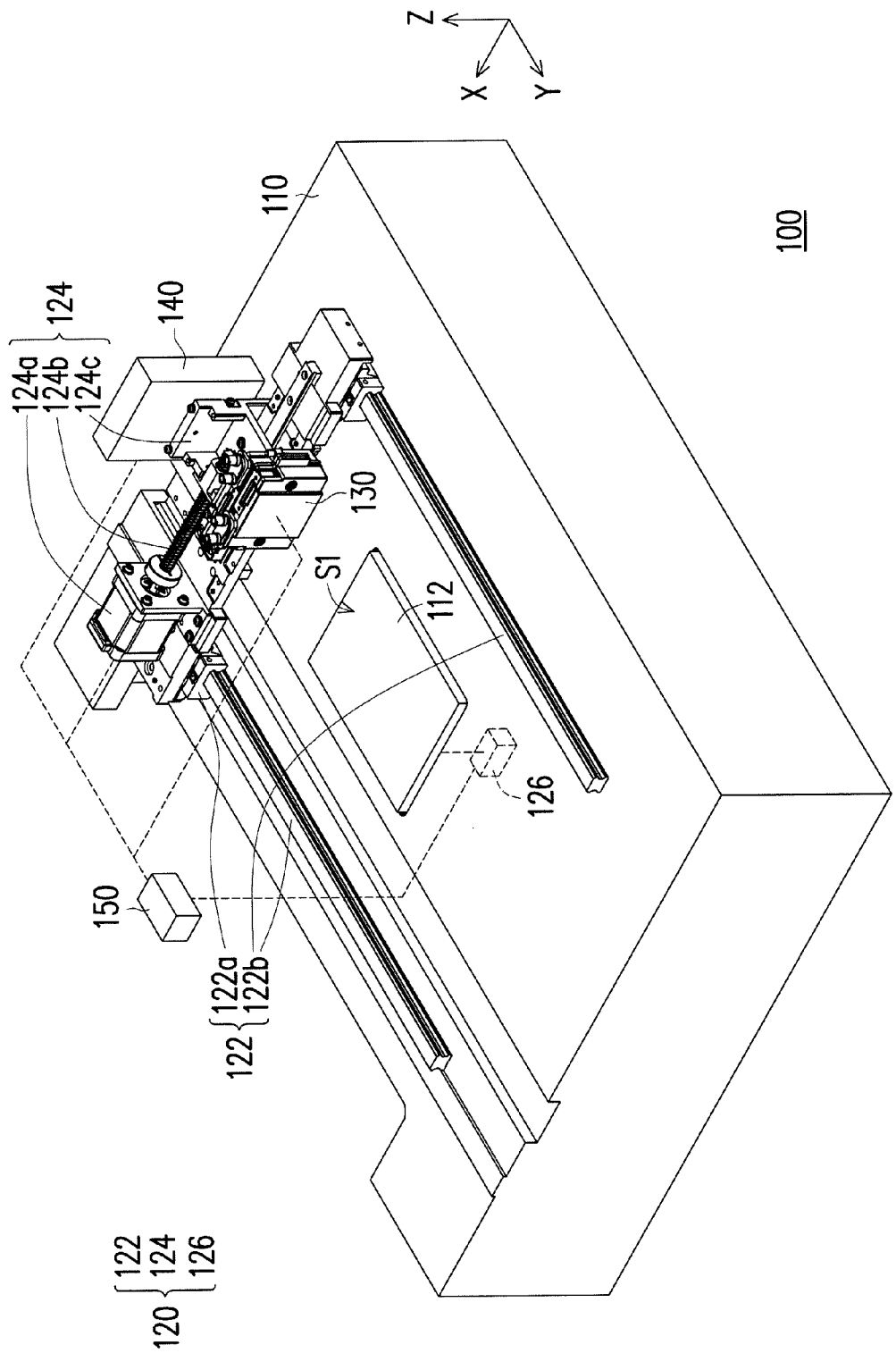
FIG. 1 is a schematic view illustrating a three dimensional (3D) printing apparatus according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a schematic view illustrating a three dimensional (3D) printing apparatus according to an embodiment of the disclosure.

Figure 2:
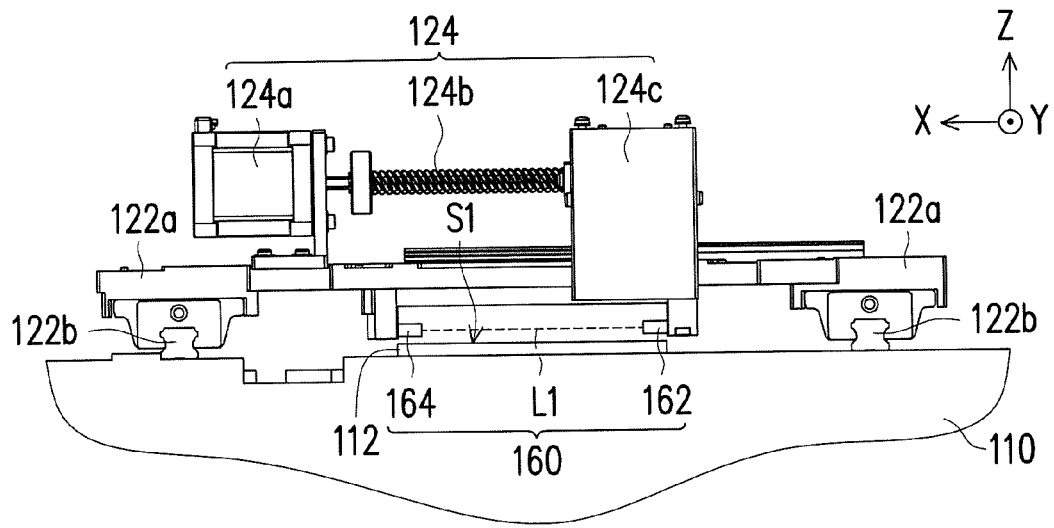
FIG. 2 and FIG. 3 are partially enlarged schematic views respectively illustrating a 3D printing apparatus in different viewing angles.
Figure 3:
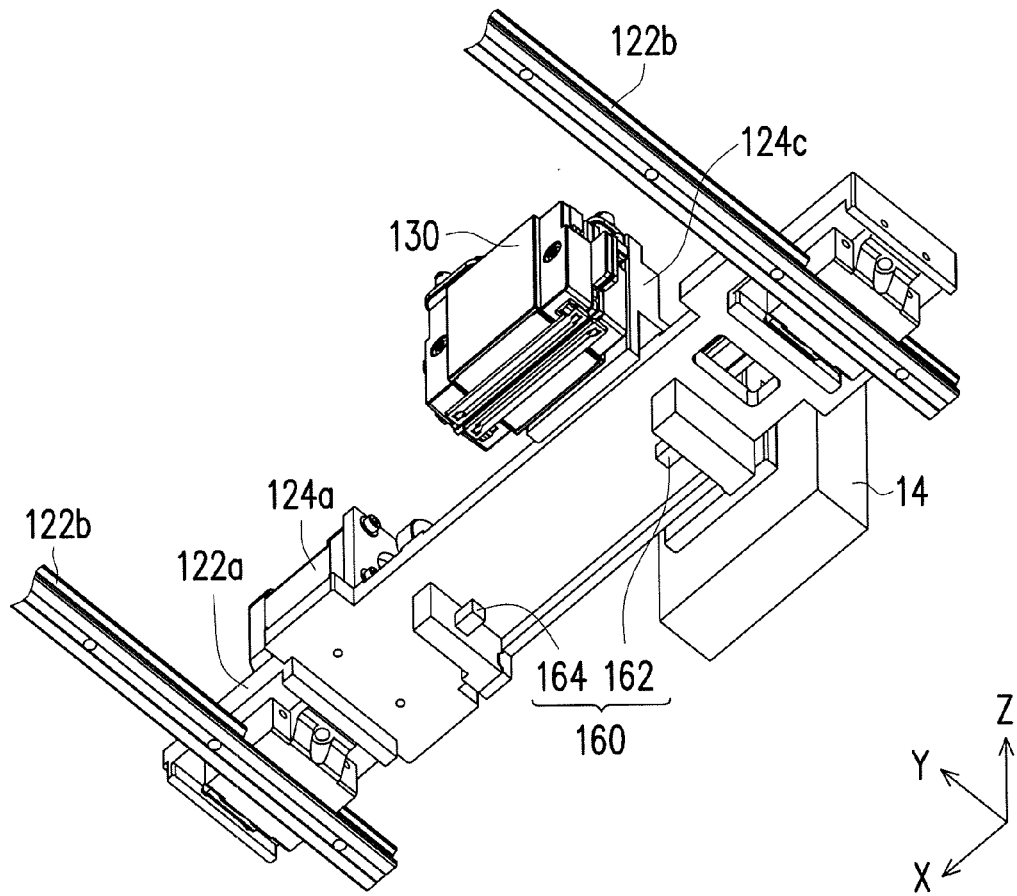

FIG. 2 and FIG. 3 are partially enlarged schematic views respectively illustrating a 3D printing apparatus in different viewing angles. With reference to FIG. 1 to FIG. 3 together, in the present embodiment, a 3D printing apparatus 100 is adapted to print out a 3D object according to a digital 3D model information. The digital 3D model information may be a digital 3D image file, which is formed by, for example, a computer-aided design (CAD) or an animation modeling software of a computer host, such that a 3D printing process may be performed via related control members of the 3D printing apparatus 100. The 3D printing apparatus 100 includes a body 110, a transmission module 120, a printing module 130, a curing module 140 and a control module 150. The body 110 includes an elevating platform 112, which has a modeling platform S1 that is a plane configured for modeling, supporting and carrying a 3D object. The transmission module 120 is disposed on the body 110, and the control module 150 is electrically connected to the transmission module 120, the printing module 130, and the curing module 140.

The transmission module 120 includes a plurality of driving assemblies 122, 124, and 126, wherein the driving assembly 122 includes a driving element 122a and a track 122b, and the driving element 122a may be movably disposed on the track 122b and move along a Y-axis. The driving assembly 124 is disposed on the driving element 122a so as to move together with the driving element 122a along the Y-axis. In the meantime, the driving assembly 124 includes a driving element 124a, a screw rod 124b, and a carrying element 124c, wherein the carrying element 124c may be movably coupled to the screw rod 124b, such that when the driving element 124a (e.g., a motor) drives the screw rod 124b to rotate about an X-axis, the driving element 124b may further drive the carrying element 124c to move along the X-axis. The driving assembly 126, which is disposed in the body 110 and connected to the elevating platform 112, is configured for driving the elevating platform 112 to move along a Z-axis. It should be noted that the transmission module 120 disclosed in the disclosure is an exemplary component. Among conventional transmission mechanisms, any component which is capable of driving the printing module 130, the curing module 140 and the elevating platform 112, and any related component to be moved which is mentioned later on may be suitable for the disclosure.

The printing module 130 and the curing module 140 are assembled to two opposite sides of the carrying element 124c along the Y-axis, respectively. Besides, when the driving assemblies 122 and 124 of the transmission module 120 are driving as mentioned previously, the printing module 130 and the curing module 140 are controlled to move along an X-Y plane. Furthermore, the elevating platform 112 is located within a moving range of the controlled printing module 130 and curing module 140. Accordingly, after the control module 150 receives a digital 3D model information, a liquid modeling material may be jetted from the printing module 130 to the modeling platform S1 of the elevating platform 112, and cured by the curing module 140 to form a modeling layer. With movements of the elevating platform 112 along the Z-axis, the modeling layers are stacked together layer by layer and a desired 3D object is formed ultimately.

Figure 4:
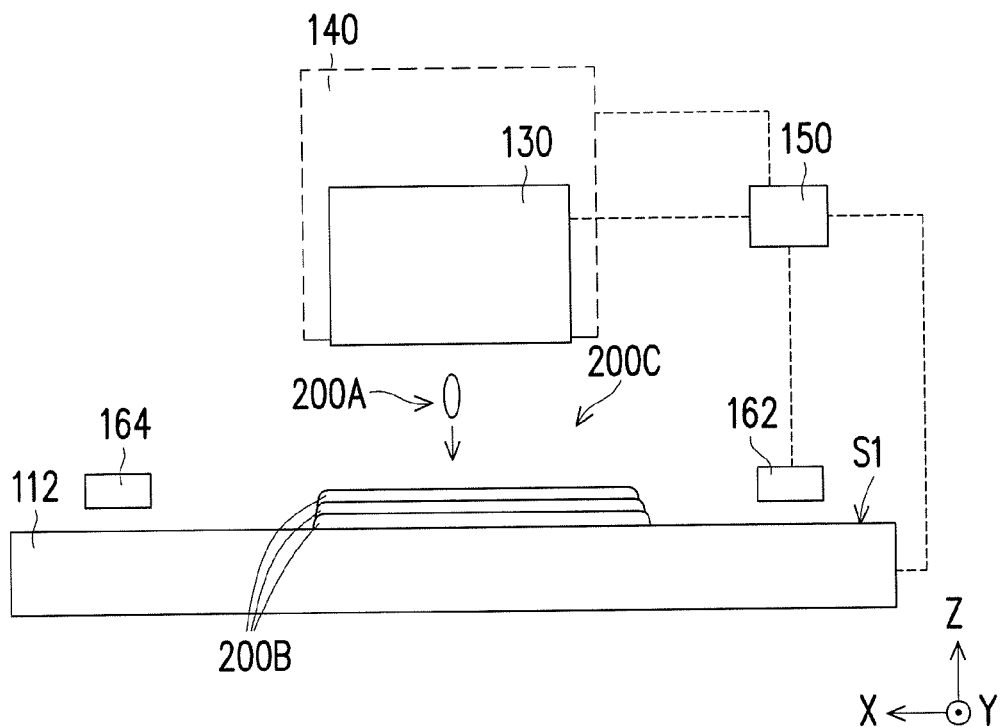
FIG. 4 and FIG. 5 are schematic views illustrating 3D printing processes, respectively.
Figure 5:
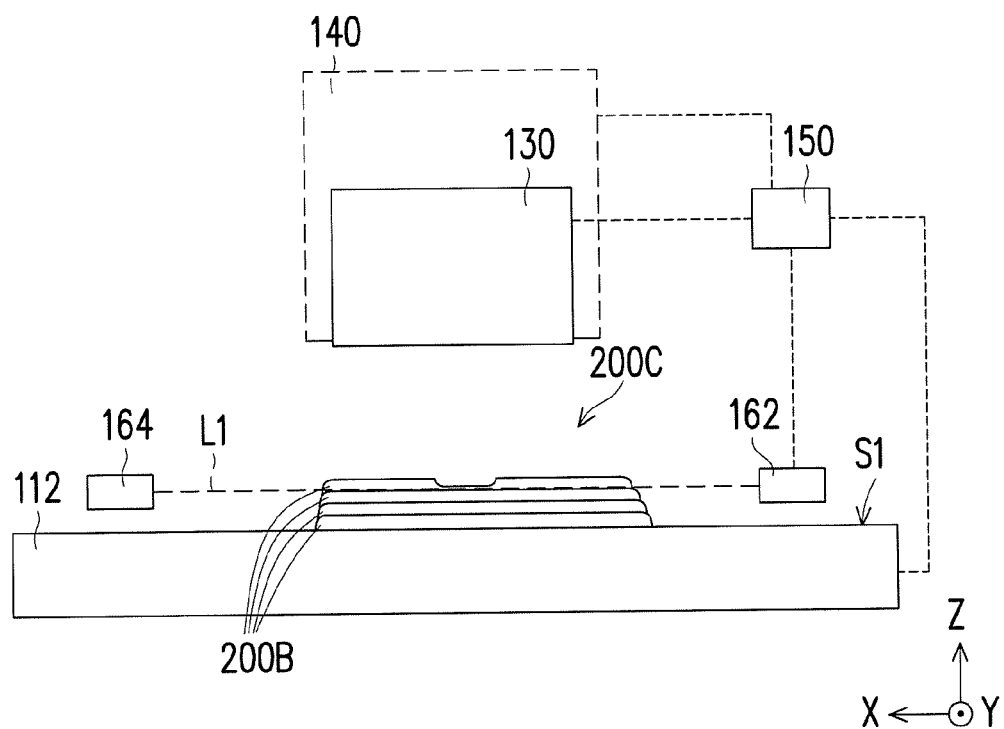

FIG. 4 and FIG. 5 are schematic views illustrating 3D printing processes, respectively.

Figure 6:
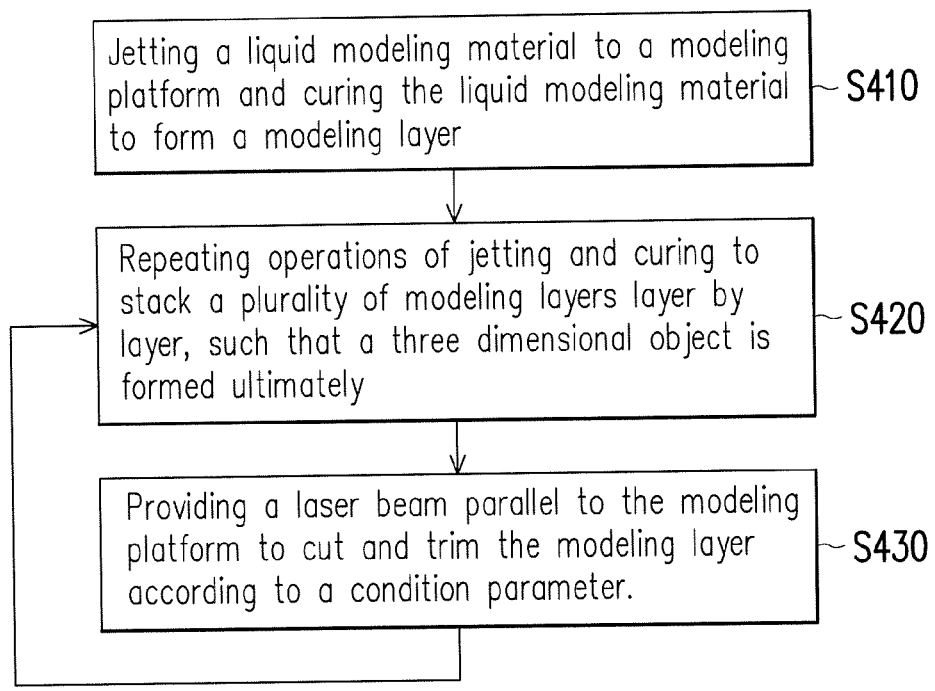
FIG. 6 is a flow chart illustrating a 3D printing process according to an embodiment of the disclosure.

FIG. 6 is a flow chart illustrating a 3D printing process according to an embodiment of the disclosure. With reference to FIG. 3, FIG. 4, and FIG. 6 together, in the present embodiment, a modeling material 200A is, for example, a liquid photopolymer resin. After the modeling material 200A is jetted from the printing module 130 to the modeling platform S1, the modeling material 200A is cured by the curing module 140, such as an ultraviolet light source, to form a modeling layer 200B. Such related operations of jetting and curing are continuously performed and the modeling layers are stacked layer by layer to form a 3D object 200C.

However, before the modeling material 200A is cured and modeled, voids could easily be formed among liquid droplets due to surface tension. Accordingly, the 3D printing apparatus 100 of the present embodiment further includes a laser module 160, which is disposed below the driving element 122a and located between a top surface of the body 110 and the transmission module 120. In addition, in the present embodiment, the laser module 160 is substantially located between the printing module 130 and the curing module 140. The laser module 160 is electrically connected to the control module 150 and includes an emitter 162 and a receiver 164. Besides, when the driving element 122a is moved to an upper part of the elevating platform 112, the emitter 162 and the receiver 164 are substantially located at two opposite sides of the modeling platform S1 along the X-axis.

In other words, the laser module 160 is also controlled by the driving assembly 122 and moves relative to the body 110 along the Y-axis, and the modeling platform S1 is located within a moving range of the laser module 160. Namely, the laser module 160, similar to the printing module 130 and the curing module 140, may perform corresponding procedures for processing the modeling layer 200B on the modeling platform S1. Accordingly, as shown in FIG. 5, the laser module 160 may provide a laser beam L1 according to a condition parameter to cut and trim the modeling layer 200B which has unfavorable surface profile along the X-Y plane, and further eliminating the void (a dotted profile illustrated in FIG. 5).

Moreover, it should be noted that the laser module 160 of the present embodiment is, for example, a carbon dioxide ($CO_2$) shortwave laser module having a wavelength of 10.6 micrometers (μm), which coordinates with properties of the modeling material, so as to facilitate operations of cutting and trimming the modeling layer 200B. In other words, varieties of the laser module of the disclosure actually may be properly adjusted based on properties of the modeling materials.

The following describes a 3D printing process of the disclosure step by step in details, wherein the components configured for achieving the operations in the steps could be acquired from the related components of the 3D printing apparatus 100. With reference to FIG. 4 to FIG. 6 together, first, in a step S410 of the present embodiment, the liquid modeling material 200A is jetted to the modeling platform S1 and cured to form the modeling layer 200B. Next, in a step S420, the operations of jetting and curing are repeated to stack a plurality of the modeling layers 200B layer by layer, such that the 3D object 200C is formed ultimately.

As shown in FIG. 5, the modeling layer 200B located on top is obviously presented with a defect (a recess as illustrated in FIG. 5). Currently, if the liquid modeling material 200A is continuously jetted while leaving the defect untreated, the void may not be filled in by the liquid modeling material 200A due to surface tension and a new void may even be formed. Once a curing is processed, the void becomes a structural defect, so that a structural strength of the 3D object 200C where the void exists raises concern. Accordingly, in the modeling process of the 3D object 200C, the modeling layer 200B of the present embodiment is cut and trimmed by a laser beam in advance as a preventive measure, so as to effectively prevent defects from being generated. Accordingly, in a step S430, i.e., in the process of modeling and stacking the modeling layers 200B, the present embodiment provides the laser beam L1 according to a condition parameter along at least one plane which is parallel to the modeling platform S1 to cut and trim at least one modeling layer 200B, so as to prevent possibilities of causing defects.

Timing for cutting and trimming the modeling layer 200B is not limited thereto. The condition parameter may include modeling time, a number of layers, or a structural height of the modeling layer 200B. Namely, a user may preset a timing for trimming the modeling layer 200B in advance. For example, the step S430 may further include: determining and confirming whether the number of layers of the modeling layer 200B achieves a predetermined number. If yes, the operation of cutting and trimming the modeling layer 200B is performed. If no, an operation of stacking the modeling layer 200B is continued. In addition, before the 3D printing apparatus 100 starts printing, a total number of layers of the modeling layer 200B may be acquired from a digital 3D model information by the control module 150, such that a user may preset a predetermined number of layers to be cut and trimmed in advance. Furthermore, trimmings may be performed when the modeling layers 200B reach a preset height by taking the modeling platform S1 as a reference. Alternatively, a final height of the 3D object 200C may be set as a target to set a difference between a height of the modeling layer 200B and the final height of the 3D object 200C as a timing for trimming.

In addition, in another embodiment which is not illustrated, a mode of repetitive cutting and trimming may be actively set by the control module 150, i.e., the step S430 may further include: once a preset number of layers of the modeling layers 200B are stacked, an operation of cutting and trimming the preset number of layers of the modeling layers 200B are performed by the laser beam L1. Alternatively, a time interval may be set as a basis for trimming.

Figure 7:
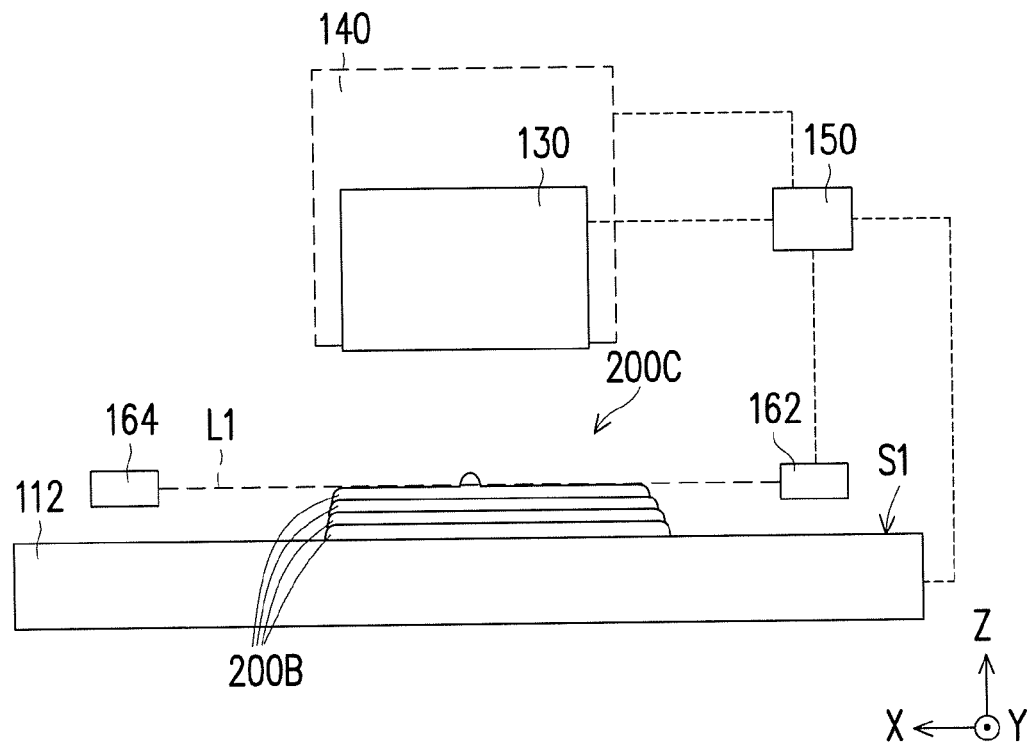
FIG. 7 is a schematic view illustrating the 3D printing process according to another embodiment of the disclosure.

FIG. 7 is a schematic view illustrating the 3D printing process according to another embodiment of the disclosure. With reference to FIG. 7, a difference between the present embodiment and the previous embodiment lies in that the modeling layer 200B of the present embodiment which is located on the top has a protrusion as an existing defect, which is different from the surface profile which is a recess. The laser beam L1 provided in the present embodiment may only trim the protrusion.

Figure 8:
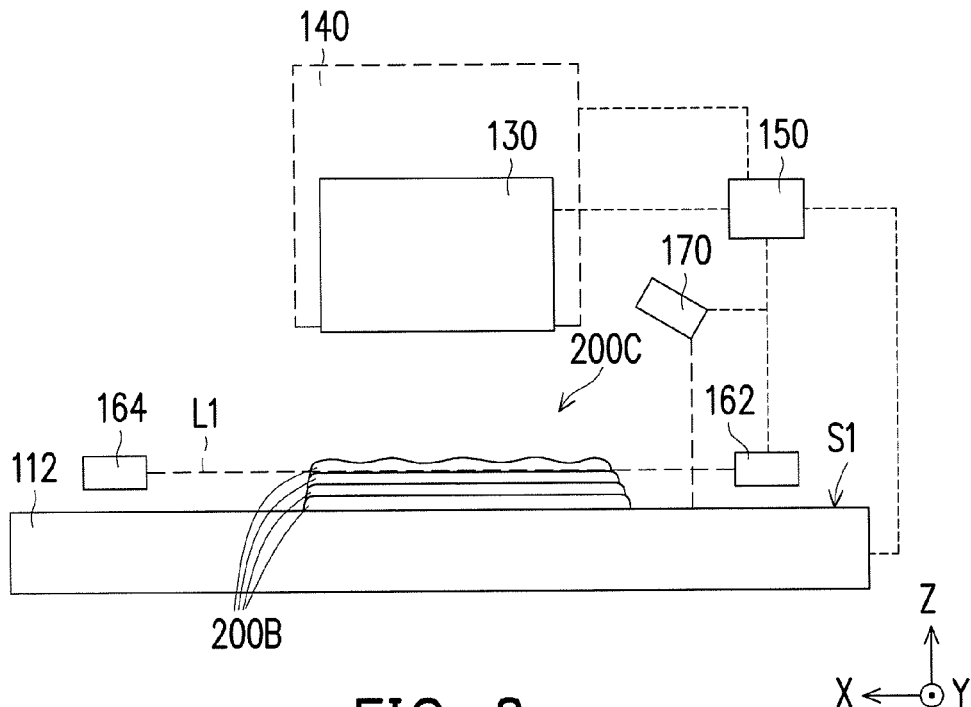
FIG. 8 is a partial schematic view illustrating the 3D printing apparatus according to another embodiment of the disclosure.
Figure 9:
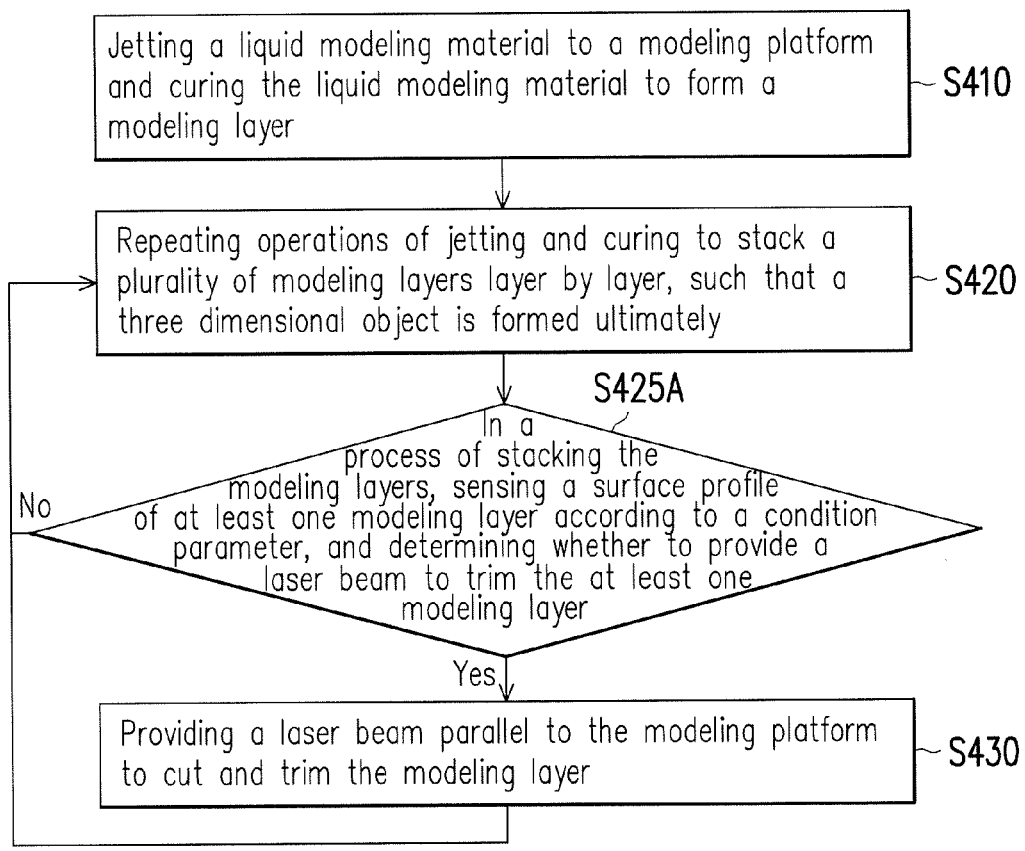
FIG. 9 is a flow chart illustrating an operation of the 3D printing apparatus of FIG. 8.

FIG. 8 is a partial schematic view illustrating the 3D printing apparatus according to another embodiment of the disclosure. FIG. 9 is a flow chart illustrating an operation of the 3D printing apparatus of FIG. 8. With reference to FIG. 8 and FIG. 9 together, a difference between the present embodiment and the previous embodiment lies in that a 3D printing apparatus 300 of the present embodiment further includes a sensor module 170, which is formed by at least one of an image sensor (e.g., CCD) or an infrared sensor. The sensor module 170 is disposed on the body 110 and adjacent to the modeling platform S1, and electrically connected to the control module 150.

Accordingly, as shown in FIG. 9, in step S425A, i.e., in a process of stacking the modeling layers 200B, a surface state (e.g., surface flatness, roughness, and the like) of the modeling layer 200B is sensed by the sensor module 170 according to a condition parameter so as to generate a profile signal. Besides, after the control module 150 receives the profile signal, a determination is made as to if the laser module 160 is driven to trim the modeling layer 200B. For example, when the surface flatness of the modeling layer 200B reaches a threshold, which means voids generated by the liquid modeling material 200A would cause defects to an entire structure, such as a state of uneven surface as shown in FIG. 8, the sensor module 170, at this time, obtains a profile signal and determines to decide to perform trimming, and the laser module 160 may be immediately driven to perform immediate operations of cutting and trimming the modeling layer 200B. Conditions for determining whether to trim or not are not limited thereon. Determinations are made according to related printing conditions such as modeling materials, a profile of a 3D object, etc. However, when protrusions and recesses coexist on the modeling layer 200B (as shown in FIG. 8), the provided laser beam actually trims the depressions on the modeling layer 200B having the recesses.

In addition, it should be noted that arrangements and locations for the sensor module in the present embodiment are not limited. In another embodiment which is not illustrated herein, the sensor module may also be disposed on the driving assembly 122 of the previous embodiments, and perform sensing by scanning the surface of the modeling layers 200B during a moving process along the Y-axis.

In summary, in the previous embodiment of the disclosure, in a process of gradually stacking modeling layers to form a 3D object, a measure of flattening at least one modeling layer is taken. Namely, a laser beam is provided to horizontally cut and trim at least one modeling layer along at least one plane which is parallel to a modeling platform. Therefore, voids caused by surface tension of a liquid modeling material may be effectively eliminated. Herein, a user may drive a laser module by a control module to cut and trim a predetermined layer of modeling layers, and immediately sense a surface state of each of the modeling layers by a sensor. When it is sensed that a surface state of a modeling layer reaches a threshold, the laser module is immediately driven for operations.

Therefore, structural defects caused by a liquid modeling material may be eliminated by trimming of a laser beam. Thus, it may be ensured that, in a process of modeling a 3D object, changes of states of a material would not be a concern, and an overall structural strength would not be adversely impacted.

Although the disclosure has been disclosed with reference to the aforesaid embodiments, they are not intended to limit the disclosure. It will be apparent to those skilled in the art that various modifications and variations can be made to the structure of the disclosed embodiments without departing from the scope or spirit of the disclosure. In view of the foregoing, it is intended that the disclosure cover modifications and variations of the specification provided they fall within the scope of the following claims and their equivalents.

What is claimed is:

1. A three dimensional (3D) printing apparatus, used for foiling and stacking a plurality of modeling layers to form a 3D object, wherein the 3D printing apparatus comprises:
    a body, having a modeling platform;
    a transmission module, disposed on the body; and
    a printing module, a curing module and a laser module, disposed at the transmission module and controlled by the transmission module to move relative to the body, respectively, a liquid modeling material being jetted from the printing module to the modeling platform and being cured by the curing module to form the modeling layers, the laser module moving along a normal direction of the modeling platform according to a condition parameter and providing a laser beam along at least one plane parallel to the modeling platform to cut and trim at least one modeling layer.

2. The 3D printing apparatus as claimed in claim 1, wherein the laser module is a carbon dioxide ($CO_2$) laser module.

3. The 3D printing apparatus as claimed in claim 1, wherein a wavelength of the laser beam provided by the laser module is 10.6 micrometers ($\mu m$).

4. The 3D printing apparatus as claimed in claim 1, further comprising:
    a sensor module, disposed on the body, the sensor module sensing a surface profile of the at least one modeling layer according to the condition parameter and generating a profile signal; and
    a control module, electrically connected to the sensor module and the laser module, the control module receiving the profile signal and determining whether the laser module is driven to trim the modeling layer according to the profile signal.

5. The 3D printing apparatus as claimed in claim 1, further comprising:
    a control module, electrically connected to the printing module, the curing module and the laser module, the control module driving the laser module to trim the modeling layer according to the condition parameter.

6. The 3D printing apparatus as claimed in claim 1, wherein the condition parameter comprises modeling time, a number of layers, or a structural height of the at least one modeling layer.

7. A 3D printing method used for modeling a 3D object, wherein the 3D printing method comprises:
    providing a liquid modeling material layer by layer on a modeling platform by a printing module and curing the liquid modeling material to form a plurality of modeling layers by a curing module, and forming the 3D object by stacking the modeling layers; and
    providing a laser beam along at least one plane parallel to the modeling platform by a laser module according to a condition parameter to cut and trim at least one modeling layer, wherein the printing module, the curing module, and the laser module are disposed at a transmission module and controlled by the transmission module.

8. The 3D printing method as claimed in claim 7, wherein the condition parameter comprises modeling time, a number of layers, or a structural height of the at least one modeling layer.

9. The 3D printing method as claimed in claim 7, further comprising:
    detecting a surface profile of the at least one modeling layer according to the condition parameter; and
    determining whether the laser beam is provided to trim the at least one modeling layer according to the detected surface profile.

10. The 3D printing method as claimed in claim 9, wherein when a protrusion and a recess coexist on the surface profile of the at least one modeling layer, the laser beam is provided to trim the modeling layer having the recess.

* * * * *